United States Patent
Main

(10) Patent No.: US 12,485,799 B2
(45) Date of Patent: Dec. 2, 2025

(54) COOLING ARRANGEMENT, MOTOR VEHICLE BATTERY, AND METHOD FOR OPERATING COOLING UNITS

(71) Applicant: AUDI AG, Ingolstadt (DE)

(72) Inventor: Eduard Main, Buxheim (DE)

(73) Assignee: AUDI AG, Ingolstadt (DE)

( * ) Notice: Subject to any disclaimer, the term of this patent is extended or adjusted under 35 U.S.C. 154(b) by 635 days.

(21) Appl. No.: 17/954,460

(22) Filed: Sep. 28, 2022

(65) Prior Publication Data

US 2023/0112971 A1  Apr. 13, 2023

(30) Foreign Application Priority Data

Oct. 13, 2021  (DE) .......................... 102021126471.5

(51) Int. Cl.
| | | |
|---|---|---|
| *H01M 10/48* | (2006.01) | |
| *B60L 58/26* | (2019.01) | |
| *H01M 10/613* | (2014.01) | |
| *H01M 10/625* | (2014.01) | |
| *H01M 10/63* | (2014.01) | |

(Continued)

(52) U.S. Cl.
CPC ............ *B60L 58/26* (2019.02); *H01M 10/482* (2013.01); *H01M 10/486* (2013.01); *H01M 10/613* (2015.04); *H01M 10/625* (2015.04); *H01M 10/63* (2015.04); *H01M 10/6568* (2015.04);

(Continued)

(58) Field of Classification Search
CPC ............... B60L 58/26; B60L 2240/545; B60L 2240/547; B60L 1/02; B60L 58/21; B60L 3/0046; H01M 10/482; H01M 10/486; H01M 10/613; H01M 10/625; H01M 10/63; H01M 10/6568; H01M 50/209; H01M 2220/20; H01M 10/617; H01M 10/6556; H01M 10/6557; H01M 10/6563;

(Continued)

(56) References Cited

U.S. PATENT DOCUMENTS

2020/0259229 A1* 8/2020 Wu ..................... H01M 10/625

FOREIGN PATENT DOCUMENTS

| | | |
|---|---|---|
| DE | 102010025525 A1 | 1/2011 |
| DE | 102009035480 A1 | 2/2011 |

(Continued)

OTHER PUBLICATIONS

Examination Report issued on Jun. 9, 2022, in connection with corresponding German Application No. 102021126471.5 (10 pp., including machine-generated English translation).

*Primary Examiner* — Lisa S Park

(74) *Attorney, Agent, or Firm* — Maier & Maier, PLLC

(57) ABSTRACT

A cooling arrangement for cooling a cell assembly having multiple cell units of a motor vehicle battery. The cooling arrangement has multiple cooling units, and a respective one of the cooling units is associated with one of the cell units. The cooling arrangement includes a control device adapted to separately control a cooling capacity for a respective one of the cooling units. In this case, the control device is designed to control the cooling units differently in a specific first cooling mode than in a specific second cooling mode different from the first. The cooling arrangement is configured in such a way that, in the event of a fault case affecting a first cell unit of the multiple cell units, a switch is performed from the first cooling mode to the second cooling mode.

17 Claims, 3 Drawing Sheets

(51) Int. Cl.
  *H01M 10/6568*  (2014.01)
  *H01M 50/209*  (2021.01)
(52) U.S. Cl.
  CPC ...... *H01M 50/209* (2021.01); *H01M 2220/20* (2013.01)
(58) Field of Classification Search
  CPC ........... H01M 10/6567; H01M 10/633; H01M 10/663; Y02E 60/10
  See application file for complete search history.

(56) References Cited

FOREIGN PATENT DOCUMENTS

| | | |
|---|---|---|
| DE | 102013021111 A1 | 6/2015 |
| DE | 102016215851 A1 | 3/2018 |
| DE | 102019213757 B3 | 2/2021 |
| WO | 2013178577 A1 | 12/2013 |

* cited by examiner

COOLING ARRANGEMENT, MOTOR VEHICLE BATTERY, AND METHOD FOR OPERATING COOLING UNITS

FIELD

The invention relates to a cooling arrangement for cooling a cell arrangement comprising a plurality of cell units of a motor vehicle battery, wherein the cooling arrangement comprises a plurality of cooling units, wherein a respective one of the cooling units is associated with one of the cell units, and wherein the cooling units comprise a control device adapted to separately control a cooling capacity for a respective one of the cooling units. Furthermore, the invention also relates to a motor vehicle battery having such a cooling arrangement and a method for operating cooling units.

BACKGROUND

Batteries for motor vehicles, in particular electric and hybrid vehicles, are known from prior art. These are usually configured as high-voltage batteries and comprise a large number of battery cells, which can also be combined into battery modules, for example. When charging these cells and operating the motor vehicle, these cells usually need to be cooled. For this purpose, current state-of-the-art high-voltage batteries are equipped with large cooling plates. All or at least multiple cell modules are positioned above a cooling plate. Thus, multiple cell modules always share one cooling plate. The cooling water always simultaneously captures all modules positioned on this common cooling plate. By distributing the modules on a common cooling plate, the modules can thus disadvantageously only be cooled or heated together. Targeted cooling of individual modules is therefore not possible. The cooling capacity is thus always controlled according to the cooling demand of the hottest module. To avoid this disadvantage, cooling systems are also known from prior art that allow cells or battery modules to be cooled individually.

For example, WO 2013/178577 A1 describes a coolant distribution system according to which individual cells can be cooled separately. Furthermore, DE 10 2010 025 525 A1 describes a method for cooling battery packs, wherein at least one battery pack is divided into several modules, and each module is cooled independently. In this case, cooling of one module can be independent of the temperature of cooling other modules.

Nevertheless, the cooling of one module can also be performed depending on the temperature of another module, which has the highest temperature value. The aim is to achieve simplification by controlling only to the temperature of the hottest module. However, this negates the advantage of the separate cooling option.

Furthermore, DE 10 2016 215 851 A1 also describes a cooling device for a battery assembly. The cooling device has at least two separately configured individual cooling elements located opposite a battery, each of which is supplied with cooling medium via its own valve assigned to the respective individual cooling element.

Furthermore, DE 10 2019 213 757 B3 describes a cooling circuit device for a battery device which has multiple battery modules, in which case the coolant valve assigned to the respective battery module can be opened if the operating temperature for the respective battery module exceeds a predetermined threshold value, in particular for the purpose of cooling the battery module in question, or falls below it, in particular for the purpose of heating the battery module.

In the systems described above, the focus is always on cooling all the battery cells of a battery as homogeneously as possible in order to achieve the most uniform aging of all battery cells possible and thus to increase the service life of the overall battery as much as possible. However, other aspects, especially safety aspects, are neglected.

SUMMARY

It is therefore the object of the present invention to provide a cooling arrangement, a motor vehicle battery and a method which allow safety to be increased in connection with the motor vehicle battery.

A cooling arrangement according to the invention for cooling a cell arrangement having multiple cell units of a motor vehicle battery comprises multiple cooling units, wherein a respective one of the cooling units is associated with one of the cell units, and wherein the cooling arrangement has a control device adapted to separately control a cooling capacity for a respective one of the cooling units. In this case, the control device is designed to control the cooling units differently in a specific first cooling mode than in a specific second cooling mode which is different from the first, wherein the cooling arrangement is set up in such a way that, in the event of a fault affecting a first cell unit of the multiple cell units, a switch is performed from the first cooling mode to the second cooling mode.

The invention is based on multiple findings at the same time: In some cases, for example when external force is applied or in the event of a short circuit, thermal runaway of a battery cell can occur. This results in strong heat generation in the cell concerned, which is also transferred to the neighboring cells in the module. These can likewise be affected by thermal runaway, resulting in thermal propagation. However, such thermal propagation can be stopped or at least delayed if the affected cell or module is cooled more intensely. However, in order to delay or even stop such thermal propagation as efficiently as possible, very high cooling capacities are required, which cannot usually be provided by normal cooling equipment or cooling strategies. This cannot be achieved, particularly if all cells or modules are cooled together via a common cooling plate, since the required cooling capacity at the affected module is reduced by the cooling of all modules. But even with conventional cooling strategies in cooling systems, which allow module-specific cooling, for example, the maximum cooling capacity that can be achieved for a particular module is severely limited when other modules are cooled at the same time. This can now be advantageously remedied by providing at least two different cooling modes. The first cooling mode can correspond to a normal cooling mode, according to which the control device controls the cooling units when there is no detected fault condition. Such a control can be performed, for example, as described for the state of the art. In the course of this first cooling mode, the individual cooling units can be controlled individually depending on a respective temperature of the cell unit assigned to them, for example. Cell units that are warmer than others, for example, can correspondingly be cooled more than others. Coupled cooling of all cell units in the first cooling mode is also conceivable. This means that, in the first cooling mode, individual cooling of all cell units needs not necessarily be performed. For example, in the first cooling mode, the cooling capacity can be set the same for all cooling units, depending on the temperature of the warmest cell unit, for example. The second cooling mode, on the other hand, now advantageously allows a different control strategy to be implemented, for example, according to which the first cell unit that has the defect is cooled with priority, for example. This means that achievement of the control targets with regard to the cooling of the remaining cell units can play a correspondingly subordinate role. In the event of a fault, in particular a thermal runaway, this in turn makes it possible to cool the cell unit affected by this defect in a targeted and prioritized manner and to concentrate the maximum cooling power that can be provided by the cooling arrangement on this affected cell unit, for example. This may include, for example, that the remaining cell units are concomitantly no longer cooled at all in order to maximize the cooling capacity for the affected first cell unit. Thus, cooling all cells or cell modules as homogeneously as possible plays only a subordinate role or no role at all in the second cooling mode. In this second cooling mode, everything can be done, so to speak, to stop thermal propagation or at least delay it as long as possible. Safety in connection with the motor vehicle battery can be significantly increased by such a control strategy or the option of such a control strategy switch or, in general, the cooling mode switch.

The switch from the first to the second cooling mode can also be controlled by the control device. In particular, the control device may be further configured to switch from the first cooling mode to the second cooling mode in the event of a detected fault condition affecting a first cell unit of the multiple cell units. Such a switch can also be passively controlled, e.g., via a passively controllable valve in the associated cooling circuit. For example, it is possible that the heat generated in the module or cell unit is used to passively control a valve in the cooling circuit depending on temperature, e.g., via a bimetal strip. Without being actuated by a control device, the valve can then be automatically brought into a certain valve position at a sufficiently high temperature, according to which an additional cooling loop of the relevant cooling unit is released for coolant to flow therethrough and which remains unused in the first operating mode, for example. When the temperature is sufficiently high, such a valve can also be passively moved to a maximum open position which is never assumed in the first cooling mode. With such passive control or passive cooling mode switch, no additional sensing is required to detect thermal runaway.

A cell unit can be a single battery cell, a cell group with multiple battery cells, or multiple such cell groups. Preferably, a cell unit comprises multiple battery cells. A cell unit may also represent a battery module with multiple battery cells, for example. The cell units forming the cell arrangement are part of a motor vehicle battery. This battery is preferably configured as a high-voltage battery. In addition, this motor vehicle battery acts as a traction battery for the motor vehicle. The battery cells can be lithium-ion cells, for example. A respective cooling unit can be configured as a cooling plate or cooling floor, for example, and in particular a respective cooling unit can preferably have a coolant flowing through it, for example, a water-glycol mixture. In principle, the cooling arrangement can be used not only for cooling the respective cell units, but also for heating the cell units, for example.

The control device may further be adapted to receive a detection signal from a detection device for detecting the fault condition. This detection signal can be used to inform the control device that such a fault has been detected or is present. Accordingly, upon receipt of this particular detection signal, which signals the presence of the particular fault condition, the control device can initiate or trigger the switch from the first cooling mode to the second cooling mode and accordingly change its control strategy for actuating the cooling units. In this context, the control device can also be adapted to determine for which of the multiple cell units the relevant fault case has been detected. In particular, this can also be communicated to the control device via the detection signal described. For example, individual cell units, for example battery modules, can each be assigned their own module control unit. When the relevant module control unit detects the relevant fault condition, for example, when the module temperature exceeds a predetermined threshold, the relevant module control unit may report this to the control device, which may for example represent a higher-level control device, for example a battery management control device. Depending on the module control unit from which the control device receives this detection signal, it is also determined which of the cell units is affected by the defect or fault. Consequently, it is another very advantageous embodiment of the invention if the cooling arrangement has a detection device adapted to detect the fault condition. One such detection device can also be provided per cell unit, for example per battery module. Such a detection device may include one or more sensors to detect the fault condition. If the fault condition is detected for a cell unit, the detection device can transmit respective information to the control device.

In this context, it is further very advantageous if the detection device is configured to detect a temperature associated with the first cell unit for detecting the fault case and to detect in case of a fault if the temperature exceeds a first predetermined limit value. In particular, thermal runaway of a cell of the cell unit can be detected especially reliably on the basis of the temperature assigned to the cell unit or even only to one cell of the cell unit. Thus, if a predetermined limit value is exceeded, this indicates the beginning of such a thermal runaway, and countermeasures can advantageously be initiated immediately by targeted and, above all, prioritized cooling of this first cell unit. This predetermined limit value can, for example, be in a temperature range between 50° C. and 70° C., for example at 60° C. However, this predetermined limit value can also be selected to be significantly higher, for example in a range between 90° C. and 130° C., in particular in a range between 100° C. and 120° C. However, multiple limit values can also be provided for implementing a suitable cooling strategy in the second cooling mode, as will be explained in more detail later. This allows gradual adjustment of the cooling strategy to prevent thermal propagation as efficiently as possible.

However, the particular fault condition need not or need not be detected exclusively on the basis of a detected temperature of the cell unit concerned, but may be detected additionally or alternatively by other means. Other examples include the detection of cell voltage, particularly a voltage dip, and/or the detection of excess pressure within a cell housing and/or module housing, the detection of a gas escaping from a battery cell, or the like. Accordingly, the detection device may include not only one or more temperature sensors, but also other sensors, for example, gas sensors, pressure sensors, voltage sensors, and/or current sensors. This allows reliable detection of the presence of such a fault condition, which in particular represents a thermal runaway of a cell or at least the beginning of such a thermal runaway.

According to another advantageous embodiment of the invention, the cooling arrangement has a cooling circuit through which a coolant can flow, wherein the cooling units are configured such that the coolant can flow through them and are part of the cooling circuit, wherein a respective one of the cooling units is associated with at least one valve device which is included by the cooling arrangement and, in particular, can be controlled by the control device, by means of which valve device a coolant flow, in particular a flow rate, through the associated cooling unit can be set, in particular wherein the cooling units can be supplied with coolant via a common supply line of the cooling arrangement and/or a common coolant reservoir of the cooling arrangement.

This structure enables particularly simple individual control of the individual cooling units. The valve devices can be configured as valves, in particular as electrically or electromagnetically controllable valves, for example. However, it is also possible that the heat generated in the module with the runaway cell is used to passively control a valve depending on temperature, e.g., via a bimetal strip. Then no additional sensing equipment is required to detect a thermal runaway. The switch from the first to the second cooling mode thus takes place passively through this temperature-dependent change in the valve position of the valve which is assigned to the cooling unit with the runaway cell or cell unit. This passive valve opening can, for example, release an additional cooling circuit unused in the first cooling mode or an additional cooling duct loop or the like, which additionally cools the respective cooling unit. This increases the flow rate through the cooling unit in question, which can automatically decrease that of the other cooling units if they are connected to the same cooling circuit. The valves may be provided in the form of chokes, for example. Control of the valve devices by the control device is also conceivable. This makes it particularly easy to adjust the flow rate. Thus, if a valve device for one of the cooling units is closed, no coolant flows through that cooling unit, or at least not through the additional cooling loop, and the flow rate equals zero. When the valve device is open, coolant flows through the associated cooling unit or through the additional cooling loop and the flow rate is different from zero. The flow rate can be adjusted appropriately depending on the valve position. A common supply line can be used to supply the individual cooling units with coolant. This can branch into individual supply paths for the respective cooling units, for example. In other words, a respective cooling unit with its associated valve or valve device can then be arranged in a respective supply path. The associated valve device can be connected upstream or downstream of the relevant cooling unit in the direction of flow. Furthermore, the individual supply paths can be reunited downstream to form a common discharge line. A common supply line and discharge line simplifies the design of the cooling circuit in this case because common circuit components can be used, such as a common pump, for example, a water pump, or a common coolant reservoir, for example, a water tank. In a specific example, according to which a respective cell unit represents a battery module and the cooling units are provided as cooling plates, each cooling plate thus receives its own valve, such that the cooling capacity of each module can be continuously adjusted. In the event of a thermal runaway and resulting thermal propagations with strong heat generation, cooling power can be sent specifically to the damaged module via the individual cooling plates and associated valves, thus cooling more efficiently and dissipating heat. This leads to a slowdown of thermal propagation, and thus increases the safety of the system. Thus, the focus is not on the fact of the cooling plate per cell module, but on the targeted operating strategy of being able to cool individual modules in order to slow down or even suppress thermal propagation. Very advantageous cooling strategies are now explained in more detail below.

In another advantageous embodiment of the invention, a first cooling unit of the multiple cooling units is associated with the first cell unit, and second cell units of the plurality of cell units which are different from the first cell unit are each associated with a second cooling unit of the multiple cooling units which is different from the first cooling unit. In other words, hereinafter the cell unit that has the defect or for which the particular fault case was detected is referred to as the first cell unit, and all other cell units are referred to as second cell units. Correspondingly, the cooling unit associated with the first cell unit is referred to as the first cooling unit, and all other cooling units are correspondingly referred to as second cooling units. According to a very advantageous embodiment of the invention, the control device is now set up in such a way that at least one of the second cooling units is deactivated in the second cooling mode. In other words, this cooling unit is controlled by the control device, in particular its associated valve, in such a way that this second deactivated cooling unit no longer has coolant flowing through it. For example, the control device closes the valve device associated with this second cooling unit. This deactivation of the second cooling unit takes place regardless of whether there is currently a cooling requirement for the second cell unit which is assigned to this deactivated second cooling unit. This is based on the finding that, by selectively deactivating cooling units, the maximum cooling capacity that can be provided by the first cooling unit can be increased. In particular, this is again made possible by the fact that the individual cooling units share common cooling circuit components, for example the above-mentioned pump or the coolant reservoir, and are supplied via a common supply line. This would not be possible if the individual cooling units were arranged in separate cooling circuits with respective cooling circuit components. In this way, the maximum cooling capacity that can be provided can be concentrated on the damaged cell or the damaged battery module or the cell group with the damaged battery module. The probability of preventing or stopping thermal propagation can thus be significantly increased.

According to another advantageous embodiment of the invention, the control device is adapted such a way that, in the second cooling mode, a cooling power assigned to the first cooling unit is increased and/or maximized under at least one predetermined boundary condition. In the second cooling mode, there are basically several ways in which the control strategy and cooling strategy can be executed. Here, for example, the above-described deactivation of at least one of the second cooling units to increase the cooling capacity is very advantageous for the first cooling unit. Nevertheless, as soon as such a defect or fault is detected for the first cell unit, it is not necessary to proceed to such a deactivation immediately in the second cooling mode. It is also conceivable to implement a cooling strategy in several stages, for example. The cooling capacity for all remaining second cooling units can also be reduced somewhat initially before switching to deactivation, for example. In all these cases, however, it is very advantageous if the cooling capacity of the first cooling unit is increased and/or maximized under certain boundary conditions. The boundary conditions allow, for example, to define the individual stages. The increase in cooling capacity may refer in particular to a comparison with the cooling capacity in the first cooling mode and/or to a comparison with the cooling capacity of other second cooling units.

In another very advantageous embodiment of the invention, the predetermined boundary condition includes that the second cooling units are controlled as in the first cooling mode, and/or at least one, in particular all, of the second cooling units are operated with reduced cooling capacity compared to the first cooling mode, and/or at least one of the second cooling units is deactivated. In particular, all of the second cooling units can again be optionally deactivated. If, for example, the fault condition is detected and thereby the temperature associated with the first cell module is greater than a first predetermined limit value, for example 60 degrees, the control device can control the cooling units such that initially the cooling capacity for the first cooling unit is maximized while the second cooling units continue to be controlled as in the first cooling mode. In other words, temperature-dependent control can be performed for the second cooling units as before, for example, such that the temperature of these second cooling units is within a predetermined set range, for example between −30° C. and +60° C. At the same time, the cooling capacity for the first cooling unit is maximized, at least within the limits of the remaining cooling capacity. For example, the valve associated with the first cooling unit can be fully opened. However, if the temperature of the first cell module continues to rise, the control device may move to reduce the cooling capacities for the remaining second cooling units. Nevertheless, cooling by the second cooling units is still possible in this case. Alternatively, if the above-mentioned first limit value is exceeded, it is possible to switch immediately to this cooling strategy, according to which the cooling capacities for the second cooling units are reduced. If the temperature of the first cell module nevertheless continues to rise and exceeds, for example, a second limit value, for example 100° C. or 120° C., the control device may proceed to deactivate at least one of the second cooling units or even to deactivate all of the second cooling units. Deactivation of the second cooling units can also take place successively, as will be explained in more detail below. After that, gradually more and more cooling capacity can be provided to cool the first cell module. Alternatively, as soon as the fault condition is detected and a predetermined temperature limit of the first cell module is exceeded, it is also possible to proceed immediately to deactivate at least one of the second cooling units. This maximizes safety as it is the most likely way to stop thermal propagation.

In another advantageous embodiment of the invention, the control device is arranged such that, in the second cooling mode, at least one of the second cooling units is deactivated and/or all of the second cooling units are deactivated as a function of a position of the second cooling unit relative to the first cooling unit. For example, it can be provided that first those cooling units are deactivated which are spatially farthest from the first cooling unit associated with the defective cell module. This is based on the knowledge that thermal propagation often spreads very quickly to neighboring modules. To prevent or delay this spreading, i.e., thermal spreading to other second cell units which are arranged immediately adjacent to the first cell unit, for example, these adjacent cell units can also continue to be cooled. Nevertheless, the cooling capacity for the first cell unit, and in particular also for its neighboring cell units, can be increased by deactivating second cooling units that are farther away. Nevertheless, it is also conceivable that, as soon as the fault is detected, all second cooling units assigned to the cell units that are not affected by the fault are deactivated immediately.

This provides numerous advantageous options for stopping or at least delaying thermal propagation in a customized manner.

Furthermore, the invention relates to a battery module having a cooling device according to the invention or one of its embodiments. The advantages described for the method according to the invention and its embodiments apply likewise to the motor vehicle battery according to the invention. In this context, the motor vehicle battery may comprise the cell arrangement with the multiple cell units. These can be configured as already described above. A respective cooling unit is then associated with one such cell unit. The motor vehicle battery is preferably configured as a high-voltage battery.

Furthermore, a motor vehicle with a cooling arrangement according to the invention or one of its embodiments or with a motor vehicle battery according to the invention or one of its embodiments is also to be considered to belong to the invention.

The motor vehicle according to the invention is preferably configured as a motor car, particularly a passenger car or truck, or as a bus or motorbike.

Furthermore, the invention also relates to a method of operating a multiple cooling units for cooling a cell arrangement comprising multiple cell units, wherein a respective one of the cooling units is associated with one of the cell units, in particular exactly one of the cell units. Furthermore, a control device separately controls a cooling capacity for a respective one of the cooling units. In addition, the control device controls the cooling units differently in a particular first cooling mode than in a particular second cooling mode which is different from the first, wherein a switch is performed from the first cooling mode to the second cooling mode in response to a fault condition affecting a first cell unit of the multiple cell units.

Again, the advantages described in connection with the cooling arrangement according to the invention and its embodiments apply equally to the method according to the invention.

The way in which the control device controls the cooling units in the respective cooling mode can be determined by a respective control strategy assigned to the respective cooling mode, which is stored in a memory of the control device. Thus, the fact that the control device controls the cooling units differently in the first cooling mode than in the second cooling mode means that a different control strategy is specified for the first cooling mode than for the second cooling mode. In other words, one control strategy may be assigned to the first cooling mode and a correspondingly different control strategy may be assigned to the second cooling mode, for example. The control strategies can be respectively stored in the control device and used depending on the detection of the fault case. Accordingly, as soon as the fault condition of the first cell unit is detected, the control device can therefore switch from the first cooling mode to the second cooling mode and accordingly switch from the first control strategy to the second control strategy.

The invention also includes the control device for the motor vehicle. The control device has a data processing device or a processor device which is configured to perform an embodiment of the method according to the invention. The processor device may comprise to this end at least one microprocessor and/or at least one microcontroller and/or at least one FPGA (field programmable gate array) and/or at least one DSP (digital signal processor). The processor device may further comprise a program code adapted to perform the method according to the invention when executed by the processor device. The program code may be stored in a data memory of the processor device.

The invention also includes further developments of the motor vehicle according to the invention, which have features already described in conjunction with further developments of the cooling arrangement according to the invention. For this reason, the respective further developments of the method according to the invention are not described once again herein.

The invention also comprises combinations of the features of the embodiments described. Thus, the invention also includes implementations, each having a combination of the features of more than one of the embodiments described, provided that the embodiments have not been described as mutually exclusive.

BRIEF DESCRIPTION OF THE FIGURES

Exemplary embodiments of the invention will be described below. Wherein.

DETAILED DESCRIPTION

Figure 1:
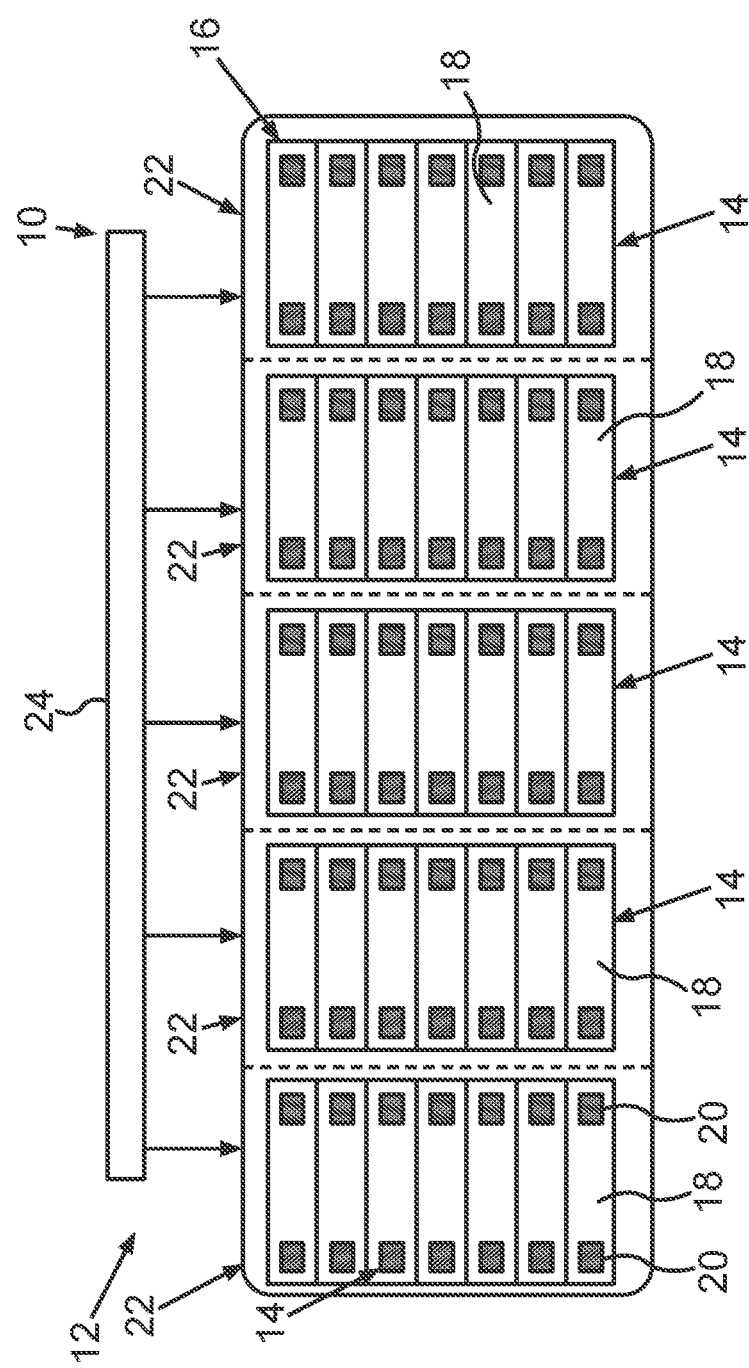
FIG. 1 is a schematic representation of a motor vehicle battery having a cooling arrangement according to an embodiment of the invention.

The exemplary embodiments explained below are preferred embodiments of the invention. The components described in the exemplary embodiment represent individual features of the invention to be viewed separately, independently of each other, each of which further developing the invention independently. The disclosure therefore is to include other than the combinations of features of the embodiments shown as well. Furthermore, the embodiments described can be supplemented by other features of the features of the invention already described.

Like reference numerals in the figures designate elements having the same function.

FIG. 1 is a schematic representation of a motor vehicle battery 10 having a cooling arrangement 12 according to an embodiment of the invention. The motor vehicle battery 10 may, for example, be configured as a high-voltage battery. Furthermore, the motor vehicle battery 10 includes multiple cell units 14 arranged in a cell arrangement 16. In this example, the respective cell units 14 are configured as battery modules 14. A respective battery module 14 in turn comprises multiple battery cells 18. For the sake of clarity, only one battery cell 18 per module 14 is designated with a reference numeral herein. FIG. 1 shows in particular a top view of the battery 10 with respect to an intended installation position in a motor vehicle. Nevertheless, other installation positions are also conceivable. A respective battery cell 18 has two cell poles 20. In this example, these are arranged on a top side of a respective cell 18, but may in principle also be arranged on other sides of the respective cell 18. Furthermore, the cooling arrangement 12 comprises multiple cooling units 22. In this case, a respective cooling unit 22 is associated with a battery module 14, in particular precisely with one battery module 14. In this example, the respective cooling units 22 are configured as respective cooling plates 22. For example, these respective cooling units 22 may also be provided by or form a common, identical cooling plate, in which case each plate part 22 may have its own cooling duct system, for example. In principle, therefore, the individual cooling units 22 can be in the form of cooling plates 22 through which a coolant can flow. Furthermore, the cooling arrangement 12 comprises a control device 24 for actuating the respective cooling units 22. Here, the control device 24 is configured to control the individual cooling units 22 separately. In other words, the control device 24 can also set different cooling capacities for the respective cooling units 22 as needed. This allows the battery modules 14 to be cooled depending on their individual cooling demands. In addition, this can also significantly increase the safety for the battery 10, as will now be explained in more detail below.

Figure 2:
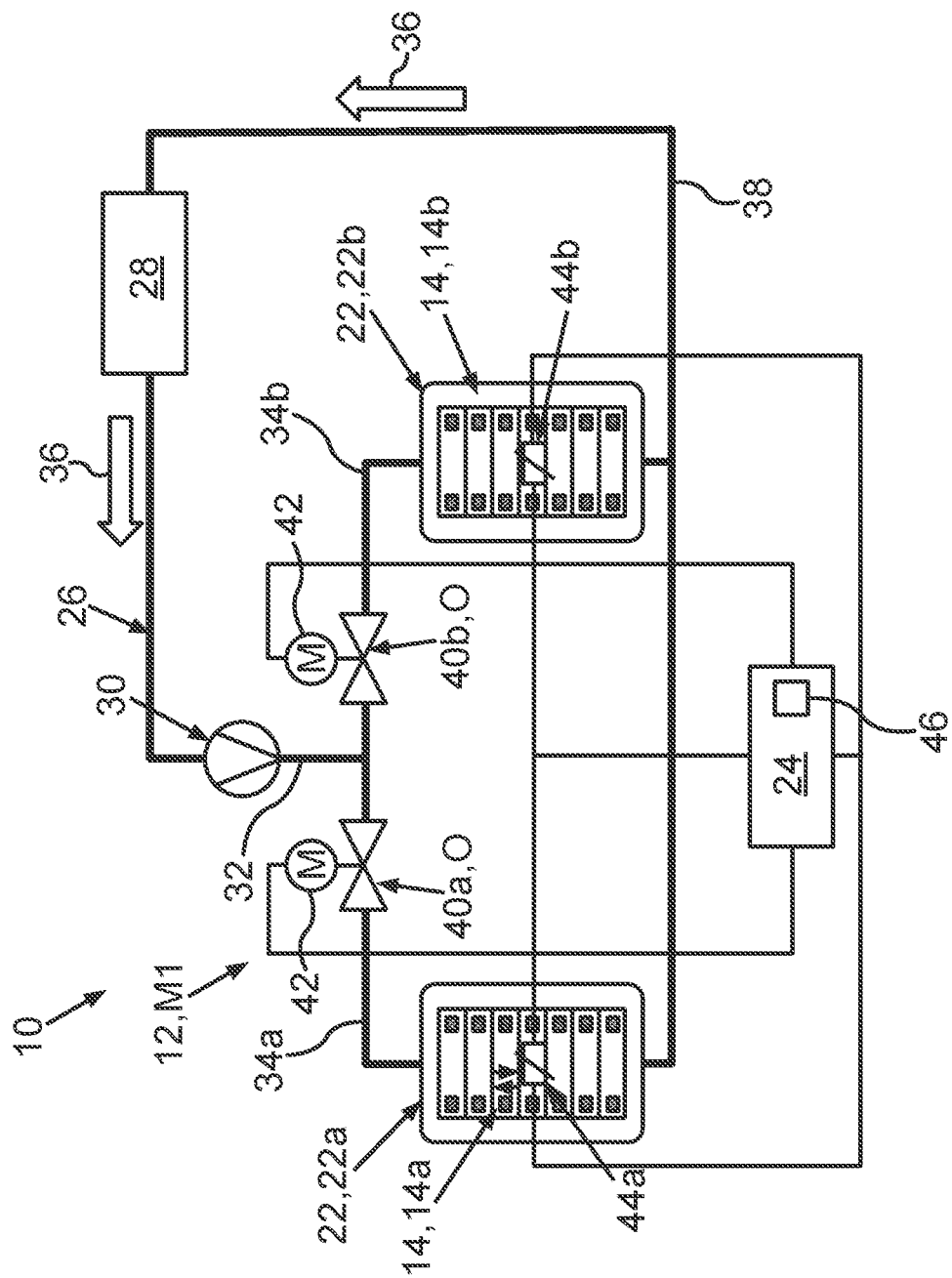
FIG. 2 is a schematic representation of a motor vehicle battery having a cooling arrangement in a first cooling mode according to an embodiment of the invention.
Figure 3:
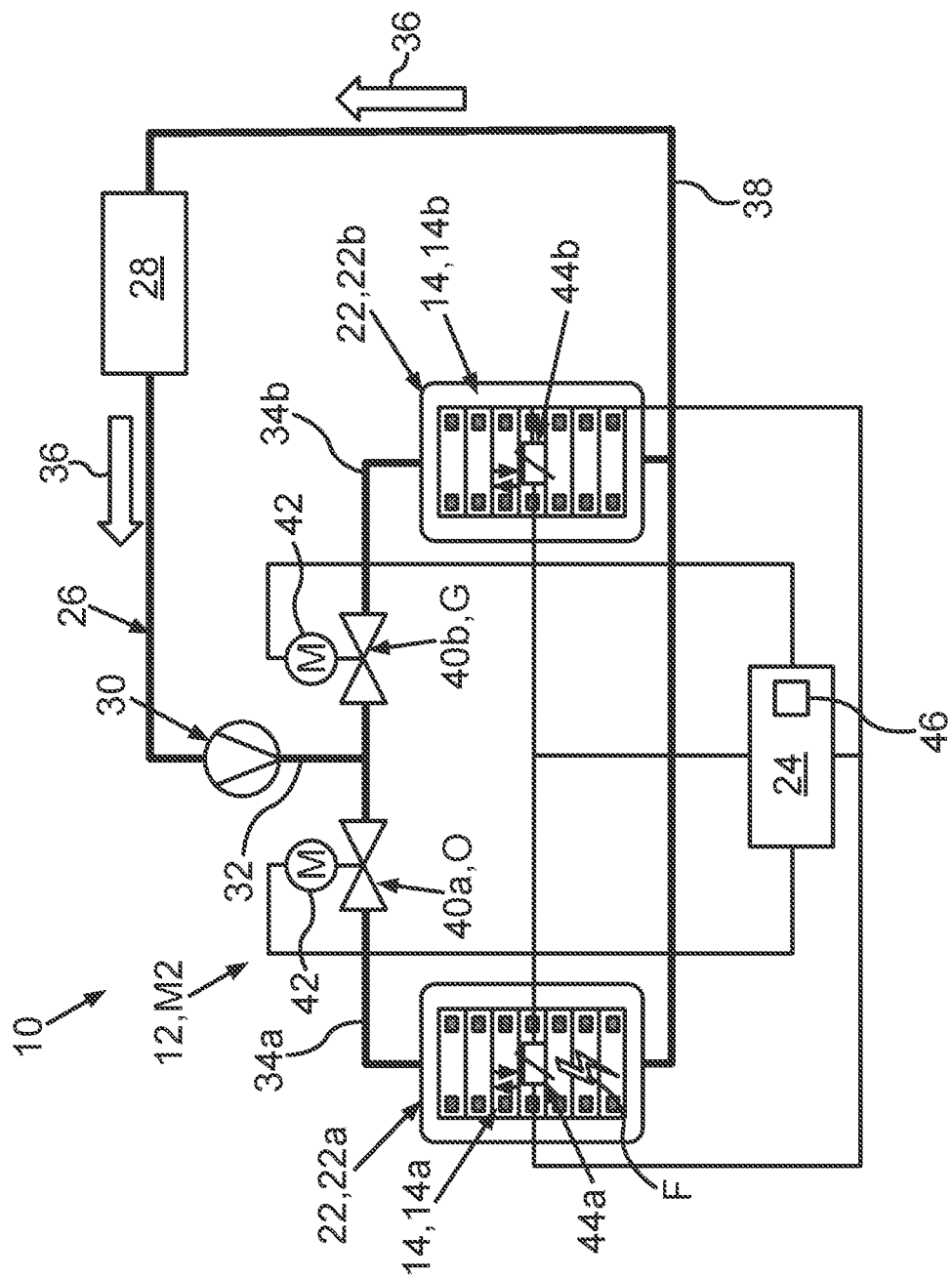
FIG. 3 is a schematic representation of the motor vehicle battery of FIG. 2 in a second cooling mode of the cooling arrangement according to an embodiment of the invention.

FIG. 2 and FIG. 3 each show a schematic representation of a battery 10 according to another embodiment of the invention. In principle, the battery 10 can be configured as described above for FIG. 1, although only two battery modules 14 of the battery 10 with their associated cooling units 22 are shown here for better illustration. A first battery module 14 is designated 14a, and a second battery module 14 is respectively designated 14b. Accordingly, the cooling unit 22 associated with the first battery module 14a is also designated 22a, and the cooling unit 22 associated with the second battery module 14b is additionally also designated 22b. In this case, the cooling units 22 are part of a cooling circuit 26. This cooling circuit 26 is in turn comprised by the cooling arrangement 12. In this respect, the cooling circuit 26 has a coolant reservoir, for example a water tank 28, and a coolant pump 30, for example a water pump. Further, a common supply line 32 is provided as part of the coolant circuit 26 to supply the individual cooling units 22. This is divided into individual supply paths 34a, 34b, in which the respective cooling units 22a, 22b are arranged. In the direction of flow, illustrated in particular by the arrows 36, the individual supply paths 34a, 34b may in turn be combined to form a common discharge line 38. The discharge line 38 thus functions as the return line and the supply line 32 as the feed line. The respective cooling units 22 are thus arranged in the respective supply paths 34a, 34b. In addition, a valve device associated with the respective cooling unit 22a, 22b is arranged in a respective supply path 34a, 34b. For simplicity, these will be referred to as valves 40a, 40b below.

Thus, in this example, each cell module 14 of the battery 10 has its own cooling plate in the form of the cooling unit 22. This cooling plate 22 has the water inlet or outlet, thus, a respective valve 40a, 40b, which can be controlled electrically, for example. In this example, the valve position can be changed via a motor 42. Actuation is performed via the control device 24. The valves 40a, 40b can each be a valve with an electromagnetic actuator or also with a linear actuator.

Furthermore, a respective battery module 14 has a temperature monitor. One or more temperature sensors can be provided per module 14 for this purpose. FIG. 2 and FIG. 3 each show only one such temperature sensor 44a, 44b. However, only one such temperature sensor 44a, 44b may be provided per battery module 14. The control device 24 may further comprise a detection module 46 configured to detect a fault condition F (see FIG. 3) as a function of the temperature detected by means of the temperature sensors 44a, 44b. For example, such a fault case F may be considered detected when the detected temperature of the relevant module 14 exceeds a predetermined limit value. In the example shown in FIG. 3, the first module 14a has such a fault F. FIG. 2, on the other hand, shows a situation in which no such fault F is present. Accordingly, the illustration in FIG. 2 corresponds to normal operation. Accordingly, the control device 24 controls the valves 40a, 40b according to a first cooling mode M1. In this case, both valves 40a, 40b are in an at least partially open position O. Accordingly, a certain cooling capacity can be provided for both battery modules 14a, 14b via the cooling units 22a, 22b, both of which having the coolant flowing through them in accordance with the valve positions. In this first cooling mode M1, it can be provided, for example, that both cooling units 22 are controlled in the same way or also that each of the cooling units 22a, 22b are controlled depending on the temperature of the respective associated cell module 14a, 14b, which in turn is detected by means of the associated temperature sensors 44a, 44b.

If the fault case F is then detected by the detection module 46, the control device 24 can advantageously switch from the first cooling mode M1 to a second cooling mode M2. This mode differs from the first cooling mode M1 with respect to actuation of the cooling units 22. According to this modified actuation, cooling of the defective module 14a is prioritized here. This prioritization can take on a large variety of forms. For example, the first cooling unit 22a may be operated at maximum available cooling capacity while the second cooling unit 22b nevertheless continues to cool the second module 14b. It is also conceivable that the cooling capacity provided by the second cooling unit 22b is reduced. However, the second cooling unit 22b can also be completely deactivated, as exemplified in FIG. 3, for example. Accordingly, the control device 24 controls the second valve 40b so that it is now in the closed position G. The flow rate in the second path 34b is thus zero. This allows the entire cooling capacity that can be provided by the cooling system to be concentrated on cooling the first module 14a.

A signal is therefore sent to the control unit or battery management system, which is represented here by the control device 24, via temperature monitoring in the cell module 14a when a setpoint is exceeded. In this case, the control unit 24 locates the position of the critical module 14a and actuates blocking of all cooling plates 22 of those modules 14 that are not affected. The damaged cell module 14a further has an open cooling plate 22a and can thus be cooled in a targeted manner. Shutting off the remaining cold plates 22b of the non-involved cell modules 14b also increases the volume flow of cooling water in the first cold plate 22a of the damaged cell module 14a. This significantly increases the cooling capacity in the damaged cell module 14a. Advantageously, this allows thermal runaway and the associated thermal propagation to be significantly delayed and even stopped under certain circumstances, even with a conventional cooling system.

Optionally, it is also conceivable that, for example, the battery modules 14 arranged immediately adjacent to the damaged module 14a also continue to be cooled, while only the battery modules 14 farther away or their associated cooling units 22 are deactivated. Thus, by cooling the immediately adjacent modules 14, thermal propagation can also be contained.

Overall, the examples show how the invention can provide switchable cooling in high-voltage batteries to suppress thermal propagation.

The invention claimed is:

1. A cooling arrangement for cooling a cell arrangement having multiple cell units of a motor vehicle battery, comprising:
multiple cooling units;
wherein a respective one of the cooling units is associated with one of the cell units; and
wherein the cooling arrangement has a control device adapted to separately control a cooling capacity for a respective one of the cooling units;
wherein the control device is configured to control the cooling units differently in a specific first cooling mode than in a specific second cooling mode which is different from the first cooling mode, wherein the cooling arrangement is set up in such a way that in the event of a fault case affecting a first cell unit of the multiple cell units, a switch is performed from the first cooling mode to the second cooling mode;
wherein the control device is configured to switch from the first cooling mode to the second cooling mode in the event of a detected fault case affecting a first cell unit of the multiple cell units, wherein the cooling arrangement has a detection device configured to detect the fault case;
wherein the first cell unit is associated with a first cooling unit of the multiple cooling units, and second cell units of the multiple cell units which are different from the first cell unit are each associated with a second cooling unit of the multiple cooling units which is different from the first cooling unit, wherein the control device is set up in such a way that at least one of the second cooling units is deactivated in the second cooling mode; and
wherein the deactivated cooling units are deactivated in an order such that those which are spatially farthest from the first cooling unit associated with a defective cell module are deactivated first.

2. The cooling device according to claim 1, wherein the detection device is configured to record a temperature associated with the first cell unit for detecting the fault case and to detect the fault case when the temperature exceeds a first predetermined limit value.

3. The cooling device according to claim 1, wherein the cooling arrangement has a cooling circuit through which a coolant can flow, wherein the cooling units are designed such that the coolant can flow through them and are part of the cooling circuit, wherein at least one valve device which is encompassed by the cooling arrangement, which can be controlled by the control device, is associated with a respective one of the cooling units by which a coolant flow through the associated cooling unit can be set, wherein the cooling units can be supplied with the coolant via a common supply line of the cooling arrangement and/or a common coolant reservoir of the cooling arrangement.

4. The cooling arrangement according to claim 1.

5. The cooling arrangement according to claim 1, wherein the first cell unit is associated with a first cooling unit of the multiple cooling units and second cell units of the multiple cell units which are different from the first cell unit are each associated with a second cooling unit which is different from the first cooling unit of the multiple cooling units, wherein the control device is set up in such a way that, in the second cooling mode, a cooling capacity associated with the first cooling unit is increased and/or maximized under at least one predetermined boundary condition.

6. The cooling device according to claim 5, wherein the predetermined boundary condition is at least one of:
the second cooling units are controlled as in the first cooling mode;

all of the second cooling units are operated with reduced cooling capacity compared to the first cooling mode; and at least one of the second cooling units is deactivated.

7. The cooling arrangement according to claim 4, wherein the control device is set up in such a way that, in the second cooling mode, at least one of the second cooling units is deactivated as a function of a position of the second cooling unit relative to the first cooling unit, and/or all of the second cooling units are deactivated.

8. A method of operating multiple cooling units for cooling a cell arrangement having multiple cell units, wherein a respective one of the cooling units is associated with one of the cell units, and wherein a control device separately controls a cooling capacity for a respective one of the cooling units;

Wherein the control device controls the cooling units differently in a specific first cooling mode than in a specific second cooling mode which is different from the first cooling mode, wherein a switch is performed from the first cooling mode to the second cooling mode as a function of a fault case relating to a first cell unit of the multiple cell units;

wherein the cell arrangement has a detection device configured to detect the fault case;

wherein the first cell unit is associated with a first cooling unit of the multiple cooling units, and second cell units of the multiple cell units which are different from the first cell unit are each associated with a second cooling unit of the multiple cooling units which is different from the first cooling unit, wherein the control device is set up in such a way that at least one of the second cooling units is deactivated in the second cooling mode; and wherein the deactivated cooling units are deactivated in an order such that those which are spatially farthest from the first cooling unit associated with a defective cell module are deactivated first.

9. The cooling device according to claim 1, wherein the cooling arrangement has a cooling circuit through which a coolant can flow, wherein the cooling units designed such that the coolant can flow through them and are part of the cooling circuit, wherein at least one valve device which is encompassed by the cooling arrangement, which can be controlled by the control device, is associated with a respective one of the cooling units, by which a coolant flow through the associated cooling unit can be set, wherein the cooling units can be supplied with the coolant via a common supply line of the cooling arrangement and/or a common coolant reservoir of the cooling arrangement.

10. The cooling device according to claim 2, wherein the cooling arrangement has a cooling circuit through which a coolant can flow, wherein the cooling units designed such that the coolant can flow through them and are part of the cooling circuit, wherein at least one valve device which is encompassed by the cooling arrangement, which can be controlled by the control device, is associated with a respective one of the cooling units, by which a coolant flow through the associated cooling unit can be set, wherein the cooling units can be supplied with the coolant via a common supply line of the cooling arrangement and/or a common coolant reservoir of the cooling arrangement.

11. The cooling arrangement according to claim 2, wherein the first cell unit is associated with a first cooling unit of the multiple cooling units, and second cell units of the multiple cell units which are different from the first cell unit are each associated with a second cooling unit of the multiple cooling units which is different from the first cooling unit, wherein the control device is set up in such a way that at least one of the second cooling units is deactivated in the second cooling mode.

12. The cooling arrangement according to claim 3, wherein the first cell unit is associated with a first cooling unit of the multiple cooling units, and second cell units of the multiple cell units which are different from the first cell unit are each associated with a second cooling unit of the multiple cooling units which is different from the first cooling unit, wherein the control device is set up in such a way that at least one of the second cooling units is deactivated in the second cooling mode.

13. The cooling arrangement according to claim 2, wherein the first cell unit is associated with a first cooling unit of the multiple cooling units, and second cell units of the multiple cell units which are different from the first cell unit are each associated with a second cooling unit which is different from the first cooling unit of the multiple cooling units, wherein the control device is set up in such a way that, in the second cooling mode, a cooling capacity associated with the first cooling unit is increased and/or maximized under at least one predetermined boundary condition.

14. The cooling arrangement according to claim 3, wherein the first cell unit is associated with a first cooling unit of the multiple cooling units, and second cell units of the multiple cell units which are different from the first cell unit are each associated with a second cooling unit which is different from the first cooling unit of the multiple cooling units, wherein the control device is set up in such a way that, in the second cooling mode, a cooling capacity associated with the first cooling unit is increased and/or maximized under at least one predetermined boundary condition.

15. The cooling arrangement according to claim 4, wherein the first cell unit is associated with a first cooling unit of the multiple cooling units, and second cell units of the multiple cell units which are different from the first cell unit are each associated with a second cooling unit which is different from the first cooling unit of the multiple cooling units, wherein the control device is set up in such a way that, in the second cooling mode, a cooling capacity associated with the first cooling unit is increased and/or maximized under at least one predetermined boundary condition.

16. The cooling arrangement according to claim 5, wherein the control device is set up in such a way that, in the second cooling mode, at least one of the second cooling units is deactivated as a function of a position of the second cooling unit relative to the first cooling unit, and/or all of the second cooling units are deactivated.

17. The cooling arrangement according to claim 6, wherein the control device is set up in such a way that, in the second cooling mode, at least one of the second cooling units is deactivated as a function of a position of the second cooling unit relative to the first cooling unit, and/or all of the second cooling units are deactivated.

* * * * *